United States Patent
Kasama

(10) Patent No.: US 8,711,158 B2
(45) Date of Patent: Apr. 29, 2014

(54) MOBILE TERMINAL INCLUDING STELLAR BODY WATCHING HOOKUP COMMUNICATIONS FUNCTION

(71) Applicant: Fujitsu Limited, Kawasaki (JP)

(72) Inventor: Kouichirou Kasama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/774,699

(22) Filed: Feb. 22, 2013

(65) Prior Publication Data

US 2013/0162660 A1 Jun. 27, 2013

Related U.S. Application Data

(63) Continuation of application No. PCT/JP2010/064496, filed on Aug. 26, 2010.

(51) Int. Cl.
*G06F 13/14* (2006.01)
(52) U.S. Cl.
USPC .......................................................... 345/520
(58) Field of Classification Search
CPC ....... G06F 17/3087; G06F 3/048; G06F 3/14; H04L 67/12; H04L 67/38; G09G 5/363; G09G 5/006; G09G 5/001; G06T 1/20
See application file for complete search history.

(56) References Cited

U.S. PATENT DOCUMENTS

| | | | |
|---|---|---|---|
| 6,946,991 B2 | 9/2005 | Hasebe et al. | |
| 2002/0077123 A1 | 6/2002 | Otsuka et al. | |
| 2004/0214587 A1 | 10/2004 | Hasebe et al. | |
| 2005/0177794 A1* | 8/2005 | Kameyama et al. | 715/748 |
| 2006/0158722 A1* | 7/2006 | Fujimoto et al. | 359/399 |
| 2009/0287655 A1* | 11/2009 | Bennett | 707/3 |
| 2010/0124735 A1* | 5/2010 | Chen et al. | 434/284 |

FOREIGN PATENT DOCUMENTS

| | | |
|---|---|---|
| JP | 2002-191067 A | 7/2002 |
| JP | 2003-209598 A | 7/2003 |
| JP | 2004-013066 A | 1/2004 |
| JP | 2004-317715 A | 11/2004 |

(Continued)

OTHER PUBLICATIONS

Notification of Transmittal of Translation of the International Preliminary Report on Patentability (Form PCT/IB/338) of International Appliation No. PCT/JP2010/064496 mailed Mar. 28, 2013 with Forms PCT/IB/373 and English translation of PCT/ISA/237.

(Continued)

*Primary Examiner* — Kee M Tung
*Assistant Examiner* — Frank Chen
(74) *Attorney, Agent, or Firm* — Westerman, Hattori, Daniels & Adrian, LLP

(57) ABSTRACT

A mobile terminal includes a detecting unit that detects a direction of the mobile terminal turned toward a stellar body existence direction; a display processing unit that acquires an image of a specific stellar body corresponding to the detected direction of the mobile terminal and image identification information thereon from a stellar body watching engine and, when any one of a plurality of kinds of information transfer is selected, that controls to display a rendered effect screen corresponding to the selected information transfer and including the image of the specific stellar body; and a transmitting unit that transmits, when the selected information transfer is carried out in a state in which the rendered effect screen is displayed, at least the image identification information or a URL associated with the image identification information along with a content of the selected information transfer.

6 Claims, 5 Drawing Sheets

(56) References Cited

FOREIGN PATENT DOCUMENTS

| | | |
|---|---|---|
| JP | 2006-221546 A | 8/2006 |
| JP | 2006-229549 A | 8/2006 |
| WO | 02/21287 A1 | 3/2002 |

OTHER PUBLICATIONS

International Search Report of PCT/JP2010/064496, mailing date of Oct. 19, 2010.

\* cited by examiner

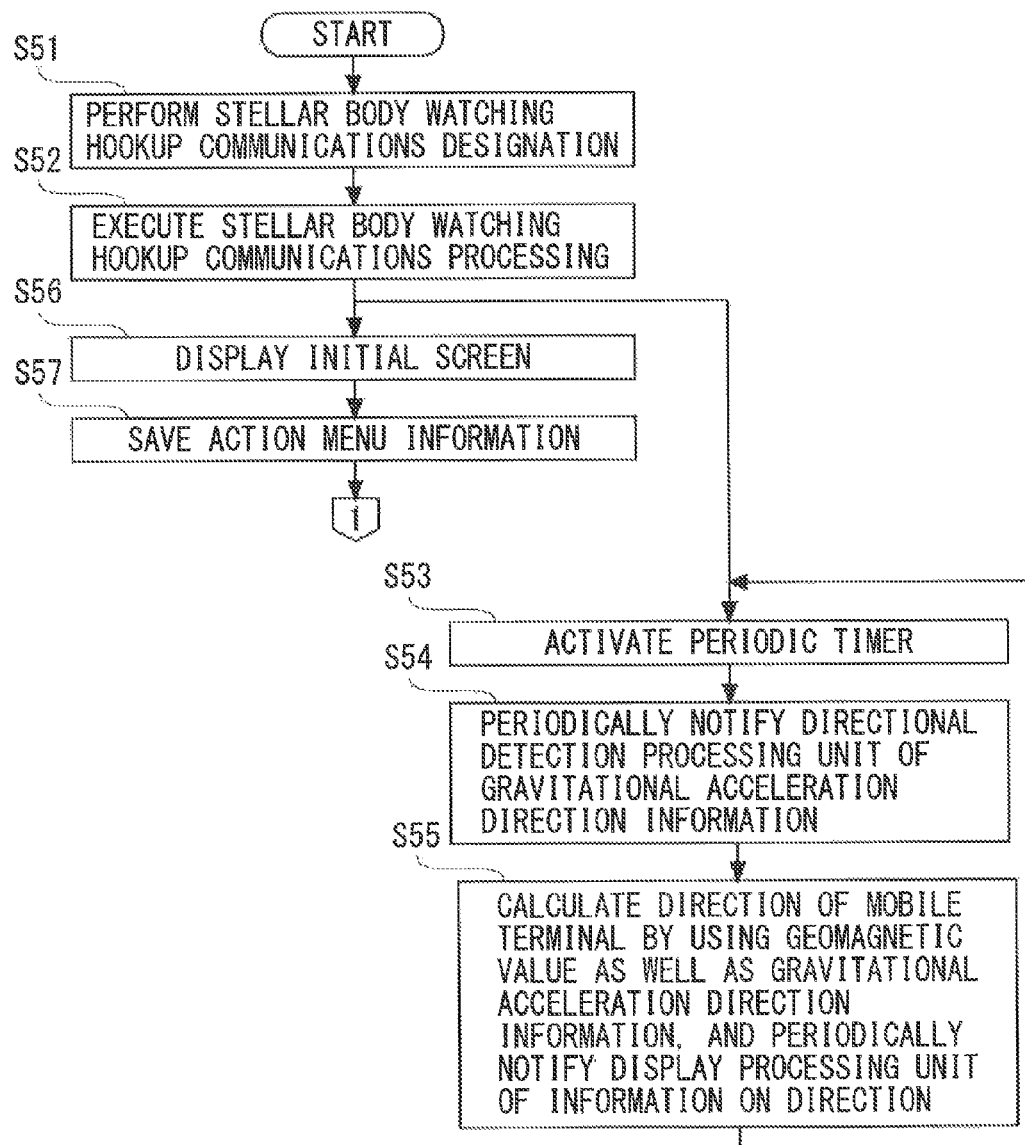

_US 8,711,158 B2_

MOBILE TERMINAL INCLUDING STELLAR BODY WATCHING HOOKUP COMMUNICATIONS FUNCTION

CROSS-REFERENCE TO RELATED APPLICATION

This is a continuation of application PCT/JP2010/064496, filed on Aug. 26, 2010, now pending, the contents of which are herein wholly incorporated by reference.

FIELD

The disclosures made herein relate to a mobile terminal including a stellar body watching hookup communications function.

BACKGROUND

In recent years, mobile terminals such as a laptop personal computer and a mobile telephone terminal including a global positioning system (GPS) receiving function have become widespread. The mobile terminal allows a user (hereinafter referred to also as "operator") to watch a desired stellar body, which is displayed by execution of a starry sky (stellar body) watching software that cooperates with various sensors such as a geomagnetic sensor and an acceleration sensor, only by pointing the mobile terminal toward a direction of a starry sky that the user wishes to watch. Such a mobile terminal can display a stellar body that could not be seen through a telescope with existence of a covering object such as a cloud or even below the horizon.

There are Patent Documents proposing a mobile terminal that displays a name of a corresponding constellation and an image of the constellation when the operator adjusts an orientation of the mobile terminal toward the direction of the constellation in concert with a GPS and a geomagnetic sensor and displays the direction of the corresponding constellation when the operator inputs the name of the constellation. This proposed mobile terminal allows the operator to enjoy an observation of the constellation even without knowledge relating to the constellation or information for identifying the constellation.

The following are related arts to the invention.

[Patent document 1] Japanese Patent Laid-Open Publication No. 2003-209598

[Patent document 2] Japanese Patent Laid-Open Publication No. 2004-13066

[Patent document 3] Japanese Patent Laid-Open Publication No. 2006-229549

[Patent document 4] WO 2002/021287

SUMMARY

According to the above-mentioned technology, it is possible to improve added value of the mobile terminal. However, there is no proposition that provides rendered effects to transmission/reception of various kinds of transfer information in concert with various sensors such as a GPS and a geomagnetic sensor and stellar body watching software and further improves the added value of the mobile terminal.

According to an aspect of the disclosures made herein, a mobile terminal includes a detecting unit that detects a direction of the mobile terminal turned toward a stellar body existence direction; a display processing unit that acquires an image of a specific stellar body corresponding to the detected direction of the mobile terminal and image identification information thereon from a stellar body watching engine and, when any one of a plurality of kinds of information transfer is selected, that controls to display a rendered effect screen corresponding to the selected information transfer and including the image of the specific stellar body; and a transmitting unit that transmits, when the selected information transfer is carried out in a state in which the rendered effect screen is displayed, at least the image identification information or a URL associated with the image identification information along with a content of the selected information transfer.

BRIEF DESCRIPTION OF THE DRAWINGS

FIG. 4A is a flowchart for describing an operation of the mobile terminal according to the embodiment;

DESCRIPTION OF EMBODIMENTS

Figure 1:
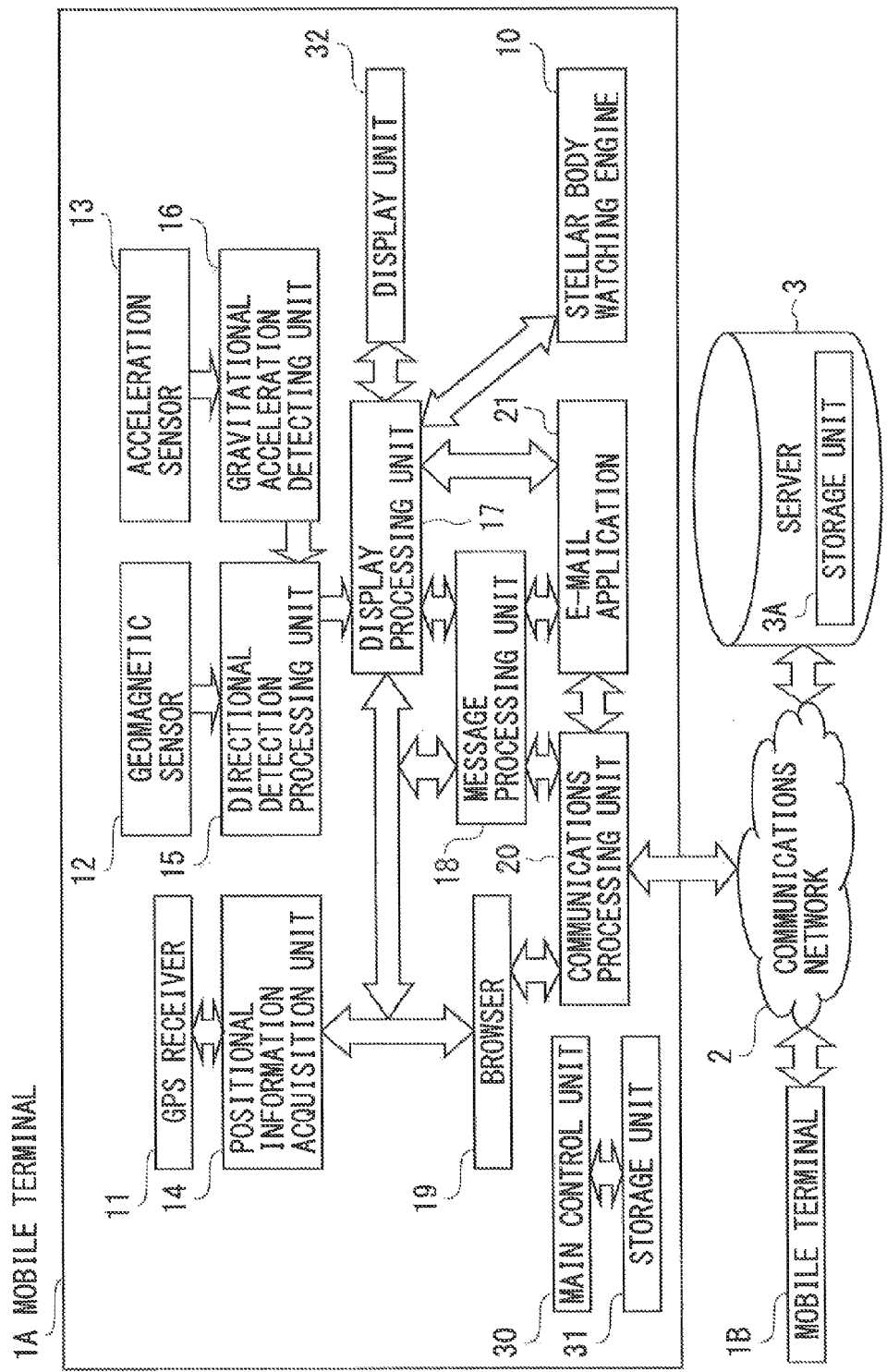
FIG. 1 is a block diagram illustrating a configuration of a mobile terminal according to an embodiment.

The embodiments of the disclosures made herein will be described below referring to the drawings in detail. The drawings illustrate preferred embodiments. It should be understood, however, that the embodiments can be implemented by many different embodiments, and are not limited to the embodiments described herein.

[Configuration and Function]

FIG. 1 illustrates a detailed configuration of a mobile terminal including a stellar body watching hookup communications function according to an embodiment of the present invention. Mobile terminals 1A and 1B employ the same configuration, and hence only the mobile terminal 1A is described here.

The mobile terminal 1A used by a user represents a mobile terminal such as a laptop personal computer or a mobile telephone terminal, and includes as general components, a central processing unit (CPU), a random access memory (RAM) being a work memory, and a read only memory (ROM) that stores the various application programs. Further, the mobile terminal 1A includes a wireless/wired network interface, a numeric keypad and various function buttons (keys) for inputting information, a display for displaying the information, a pointing unit for designation of the information, and a cursor forwarding unit.

A main control unit 30 illustrated in FIG. 1 corresponds to the CPU, a storage unit 31 corresponds to the RAM and the ROM, and a display unit 32 corresponds to the display. The other general components can be easily understood and carried out by a person skilled in the art, and hence illustration thereof is omitted.

In order to logically realize the stellar body watching hookup communications function to be described later in detail, on the mobile terminal 1A, with a stellar body watching hookup communications control program previously installed in the ROM of the storage unit 31 as the application program, the main control unit 30 expands this control program in the RAM of the storage unit 31 and executes the control program in response to a trigger such as a request received from the user.

The mobile terminal 1A includes a stellar body watching engine 10, a GPS receiver 11, a geomagnetic sensor 12, and an acceleration sensor 13. Further, the mobile terminal 1A includes a positional information acquisition unit 14, a directional detection processing unit 15, and a gravitational acceleration detecting unit 16. The mobile terminal 1A further includes a display processing unit 17, a message processing unit 18, a browser 19, a communications processing unit 20, and an e-mail application 21. Note that, in FIG. 1, the illustration of connection relationships between those components and the main control unit 30 and the storage unit 31 is omitted for the sake of simplicity.

The stellar body watching engine 10 can be constituted by starry sky watching software (for example, Stellar Window) including a viewing angle adjusting function such as enlargement and reduction of a displayed stellar body, a basic information displaying function for a stellar body name or the like, and a stellar body search function using a keyword input. This stellar body watching engine 10 only requires the user to point a predetermined portion of the mobile terminal 1A toward an existence direction of a stellar body that the user wishes to watch, to thereby display even a stellar body that could not actually be seen from a current position with existence of a covering object such as a cloud or even below the horizon with reference to the information acquired from the GPS receiver 11, the geomagnetic sensor 12, and the acceleration sensor 13 and other such information. Here, the stellar body includes a fixed star, a constellation, a nebula/star cluster/galaxy, a planet, and an artificial satellite.

The GPS receiver 11 receives positioning signals transmitted from a plurality of GPS satellites, and outputs geographical positional information (longitude and latitude) in which the mobile terminal 1A is located, in response to the request received from the positional information acquisition unit 14.

The positional information acquisition unit 14 acquires positional information from the GPS receiver 11 in response to the request received from the display processing unit 17. In addition, the positional information acquisition unit 14 identifies a location from the acquired positional information, and notifies the display processing unit 17, the message processing unit 18, and the browser 19 of location information (for example, YY-city, XX-prefecture).

The geomagnetic sensor 12 measures a geomagnetic value for each of three axes in an X-axis direction, a Y-axis direction, and a Z-axis direction that are orthogonal to one another. Here, the geomagnetic value is a geomagnetic vector, and is strictly a true north vector caused by geomagnetism.

The acceleration sensor 13 measures an acceleration value for each of the three axes in the X-axis direction, the Y-axis direction, the Z-axis direction that are orthogonal to one another. Here, the acceleration value is an acceleration vector, and is strictly a gravitational acceleration direction vector.

The gravitational acceleration detecting unit 16 acquires the acceleration value for each of the three axes from the acceleration sensor 13, and detects a gravitational acceleration direction. The gravitational acceleration detecting unit 16 notifies the directional detection processing unit 15 of gravitational acceleration direction information periodically (for example, every 20 ms).

The directional detection processing unit 15 acquires the true north vector as the geomagnetic value for each of the three axes from the geomagnetic sensor 12, and detects (calculates) a direction of the mobile terminal 1A corresponding to the existence direction of a desired stellar body by using the geomagnetic value as well as the gravitational acceleration direction vector of the gravitational acceleration direction information which the directional detection processing unit 15 is notified of by the gravitational acceleration detecting unit 16. The direction of the mobile terminal 1A is defined based on an azimuth corresponding to an angle within a horizontal plane (direction) and a posture corresponding to an angle within a vertical plane (elevation angle or depression angle).

The directional detection processing unit 15 performs a declination correction between a magnetic north and a true north of Earth when detecting the direction of the mobile terminal 1A. The directional detection processing unit 15 notifies the display processing unit 17 of the information on the calculated direction periodically (for example, every 20 ms).

The display processing unit 17 includes the following processing functions of:

(A1) displaying Image data (image and description data) on the specific stellar body acquired from the stellar body watching engine 10 on the display unit 32 in accordance with the information on the direction of the mobile terminal 1A which the display processing unit 17 is notified of by the directional detection processing unit 15 and other such information;

(A2) when an e-mail transmission (e-mail transfer) request is received from the user, activating the e-mail application 21, and passing an image data ID (image identification information) of the stellar body thereto;

(A3) when a message transfer request is received from the user, passing a uniform resource locator (URL) being an address or identifier of a server 3 associated in advance with the image data ID of the stellar body, and activating the browser 19;

(A4) when a location information transfer request is received from the user, notifying the positional information acquisition unit 14 of a positional information acquisition request;

(A5) when the location information transfer request is received from the user, activating the e-mail application 21, and passing the image data ID of the stellar body and the location information thereto;

(A6) as an e-mail receiving event, displaying an image corresponding to the image data ID of the stellar body received from the message processing unit 18 on the display unit 32, and then notifying the message processing unit 18 that display processing has been performed; and (A7) as the e-mail receiving event, when there is a match in the image data ID of the stellar body received from the message processing unit 18, based on the location information on an own terminal and the location information on the terminal of the other party, calculating a distance therebetween, and displaying distance information on the display unit 32.

The message processing unit 18 includes the following processing functions of:

(B1) when the e-mail receiving event including the image data ID of the stellar body is received from the communications processing unit 20, saving e-mail data including an e-mail header and an e-mail body to the storage unit 31, and then writing a guidance for turning toward the existence direction of the specific stellar body based on the image data ID of the stellar body within the e-mail body into the e-mail body;

(B2) passing the e-mail data, which is obtained in Step (B1) by writing the guidance for turning toward the existence direction of the specific stellar body into the e-mail body, to the e-mail application 21;

(B3) passing the image data ID of the stellar body within the e-mail body obtained in Step (B1) to the display processing unit 17;

(B4) passing the e-mail data saved in Step (B1) to the e-mail application 21; and (B5) when the e-mail receiving event including the image data ID of the stellar body, the location information, and the transfer type is received from the communications processing unit 20, passing the image data ID of the stellar body, the location information, and the transfer type to the display processing unit 17.

The e-mail application (mailer) 21 displays the e-mail data received from the message processing unit 18 on the display unit 32 via the display processing unit 17. The e-mail application 21 is activated in response to the request received from the display processing unit 17, and allows the user to edit e-mail. The e-mail application 21 adds the image data ID of the stellar body received from the display processing unit 17 to the e-mail body after the e-mail is edited before the communications processing unit 20 is notified of the e-mail data.

The browser (web browser) 19 is activated in response to the request received from the display processing unit 17, and allows access to a specific connection destination based on the URL, in other words, to the server 3 as well as the user's editing of a message or the like.

The server 3 is a server computer, and includes a central control device, a main storage device, a hard disk drive serving as an auxiliary storage device, and a network interface. However, a detailed configuration thereof is not illustrated here. The server 3 saves to a storage unit 3A various kinds of transfer information, in other words, the location information, the message created by the user, and the like, which are uploaded from the mobile terminals 1A and 1B through a communications network 2.

[Operation]

Next, a description is made of stellar body watching hookup communications performed by the mobile terminals 1A and 1B according to the embodiment of the present invention illustrated in FIG. 1 with reference to the relating drawings.

The mobile terminal 1A used by a transmitting user and the mobile terminal 1B used by a receiving user perform the stellar body watching hookup communications through the communications network 2 in cooperation with the e-mail application 21 or the server 3.

The transmitting user turns the mobile terminal 1A toward the existence direction of the desired stellar body that is known in advance by the transmitting user, and performs stellar body watching hookup communications designation from a standby status via a menu screen (not shown).

On the mobile terminal 1A on a transmitting end, in response to a trigger of the stellar body watching hookup communications designation performed by the transmitting user (S51 in FIG. 4A), the main control unit 30 expands in the RAM of the storage unit 31 the stellar body watching hookup communications control program installed in the ROM of the storage unit 31 as the application program, and starts to execute stellar body watching hookup communications processing (S52).

Subsequently to Step S52, the main control unit 30 activates a preset periodic timer (S53). The gravitational acceleration detecting unit 16 acquires the acceleration value for each of the three axes from the acceleration sensor 13, and notifies the directional detection processing unit 15 of the gravitational acceleration direction information periodically (for example, every 20 ms) (S54).

The directional detection processing unit 15 acquires the geomagnetic value for each of the three axes from the geomagnetic sensor 12, calculates the direction (azimuth and posture) of the mobile terminal 1A corresponding to the existence direction of the desired stellar body by using the geomagnetic value as well as the gravitational acceleration direction information that the directional detection processing unit 15 has been notified of, and notifies the display processing unit 17 of the information on the direction periodically (for example, every 20 ms) (S55). Those Steps S53, S54, and S55 are repeated until the execution of the stellar body watching hookup communications processing is finished.

The display processing unit 17 acquires image data on the specific stellar body corresponding to the direction of the mobile terminal 1A calculated by the directional detection processing unit 15 from the stellar body watching engine 10 along with an ID (image identification information), and displays this image data on the stellar body on the display unit 32 as an initial screen 41 (S56).

Figure 2:
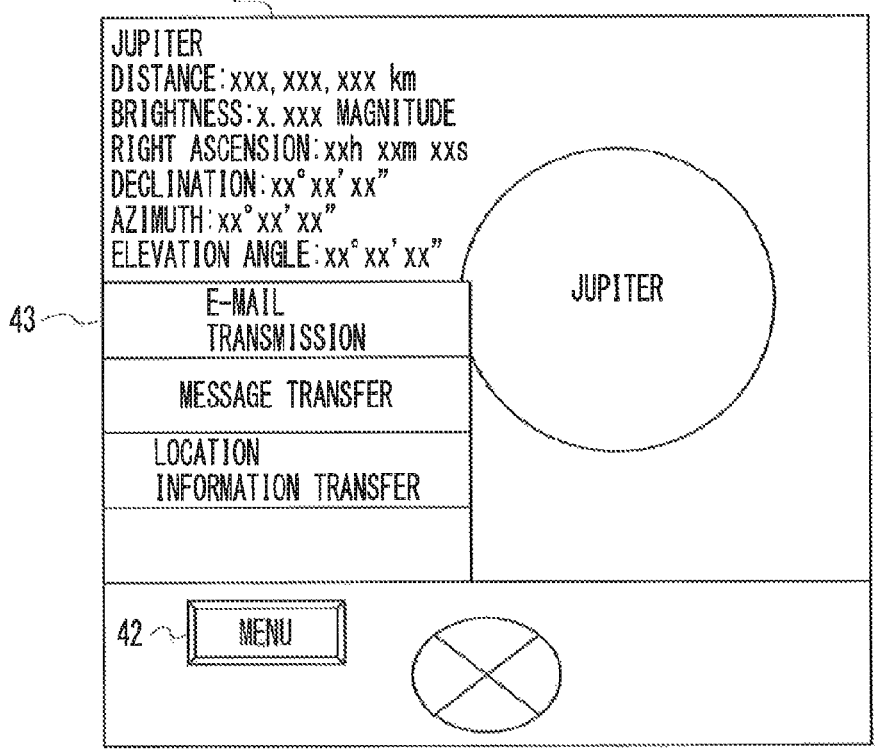
FIG. 2 illustrates an initial screen displayed on the mobile terminal according to the embodiment.

FIG. 2 illustrates an example of the initial screen 41. The image and description data (stellar body name, distance, brightness, right ascension, declination, azimuth, elevation angle) relating to Jupiter serving as the specific stellar body are displayed on the initial screen 41 as the image data on the stellar body. On this initial screen 41, an action menu 43 is displayed when the transmitting user specifies a menu key 42. This action menu 43 includes respective information transfer requests for an e-mail transmission (e-mail transfer), a message transfer, and a location information transfer as action menu information. Here, when the location information transfer request is selected, a pulldown menu that allows the location information transfer or a distance information transfer to be further selected is displayed as the transfer type.

The display processing unit 17 temporarily saves the action menu information selected by the transmitting user on the initial screen 41 to the storage unit 31 for use in later steps (S57).

Figure 4B:
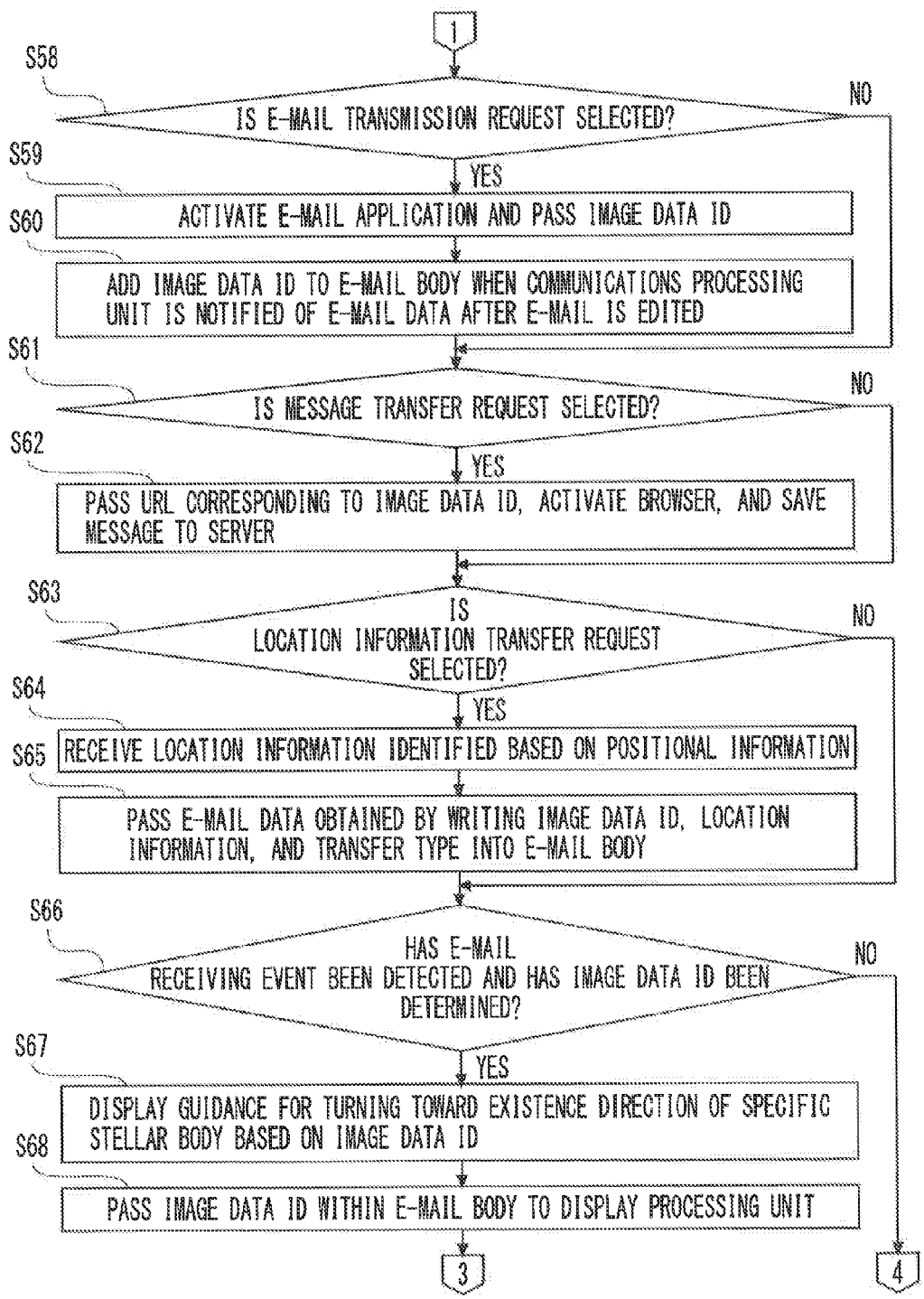
FIG. 4B is a flowchart for describing the operation of the mobile terminal according to the embodiment.
Figure 4C:
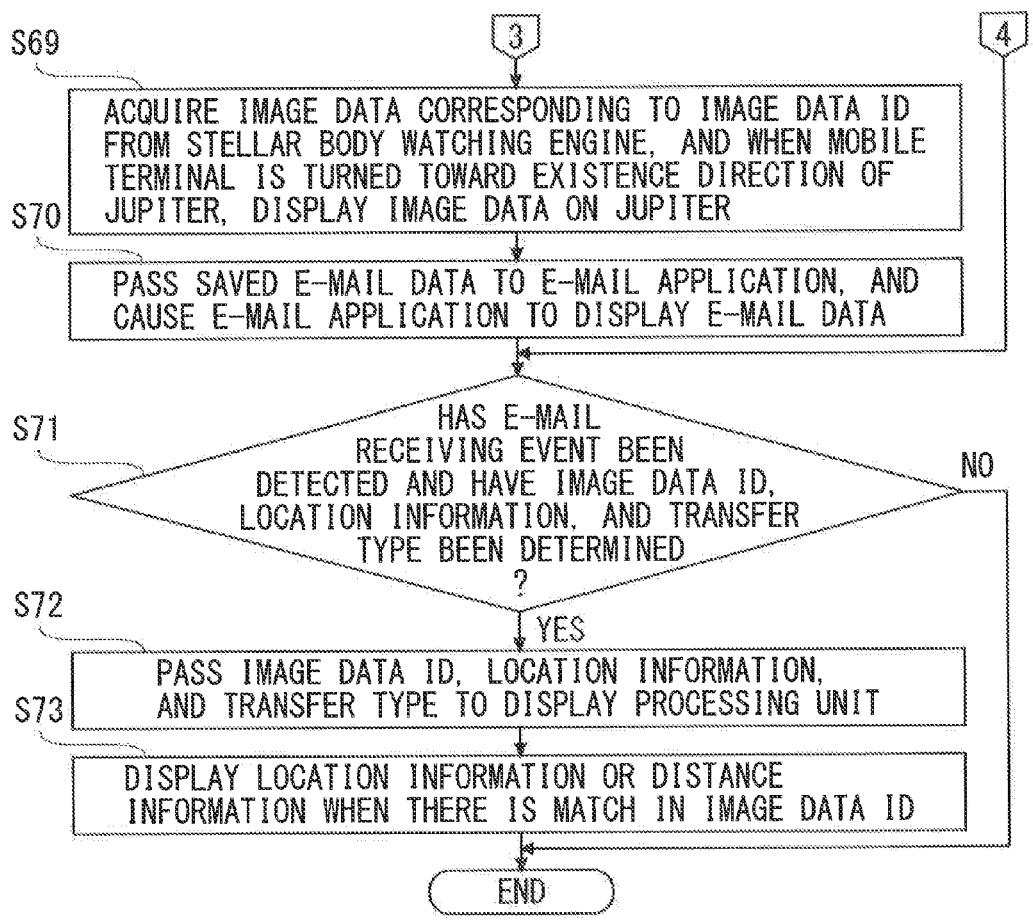
FIG. 4C is a flowchart for describing the operation of the mobile terminal according to the embodiment.

Subsequently, the display processing unit 17 refers to the saved information to determine whether or not the selection from the action menu 43 made by the transmitting user on the initial screen 41 is the e-mail transmission request (S58 in FIG. 4B). When a determination result thereof is not the e-mail transmission request, the procedure advances to Step S61.

When the e-mail transmission request is determined (Yes), the display processing unit 17 activates the e-mail application 21, and passes the image data ID of the stellar body (Jupiter) being displayed to the message processing unit 18 (S59). The image data ID is managed by the stellar body watching engine 10 along with the image and description data serving as the image data on the stellar body.

After the transmitting user edits the e-mail, the e-mail application 21 notifies the communications processing unit 20 of the e-mail data including the e-mail header and the e-mail body via the message processing unit 18. At this time, the message processing unit 18 adds the image data ID of Jupiter received from the display processing unit 17 to the e-mail body (S60). The e-mail body of the e-mail data to be transmitted from the communications processing unit 20 to the mobile terminal 1B includes the image data ID of Jupiter.

Figure 3:
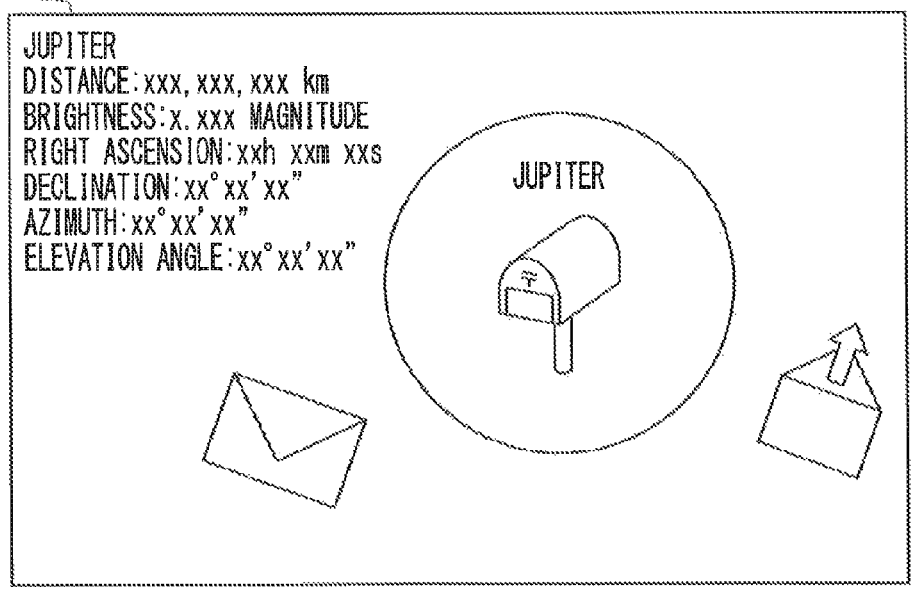
FIG. 3 illustrates a rendered effect screen displayed on the mobile terminal according to the embodiment.

FIG. 3 illustrates an example of a rendered effect screen 44 displayed on the display unit 32 by the display processing unit 17 when the action menu 43 selected on the initial screen 41 is the e-mail transmission request. This rendered effect screen 44 is intended to transmit the e-mail serving as the transfer information to the existence direction of Jupiter that the user of the mobile terminal 1A wishes to show to the other party (user of the mobile terminal 1B) to be a recipient of the e-mail. This rendered effect screen 44 includes a mailbox and letter marks in order to display features of the e-mail transmission.

Subsequently, the display processing unit 17 refers to the saved information to determine whether or not the selection from the action menu 43 made by the transmitting user on the initial screen 41 is the message transfer request (S61). When the determination result is not the message transfer request, the procedure advances to Step S63.

When the message transfer request is determined (Yes), the display processing unit 17 acquires the URL corresponding to the image data ID of Jupiter from an ID-URL correspondence table (not shown) of the storage unit 31, passes the URL to the browser 19, and activates the browser 19 (S62).

The browser 19 is activated in response to the request received from the display processing unit 17, and allows the access to the specific connection destination based on the URL, in other words, to the server 3 as well as the transmitting user's editing of the message or the like (S62).

The server 3 saves to the storage unit 3A the transfer information, in other words, the message created by the user, which is uploaded from the message processing unit 18 through the communications network 2 of the mobile terminal 1A on the transmitting end (S62).

When the action menu 43 selected on the initial screen 41 is the message transfer request, the rendered effect screen 44 displayed on the display unit 32 by the display processing unit 17 is intended to distribute a message (for example, commercial message (CM)) that the user of the mobile terminal 1A wishes to show to many and unspecified other parties (including the user of the mobile terminal 1B) to the existence direction of Jupiter and leave (retain) the message in a specific place (storage area) of the server 3 associated with Jupiter.

Later on the mobile terminal 1B, when the receiving user voluntarily or coincidentally turns the mobile terminal 1B toward the existence direction of Jupiter, the display processing unit 17 and the message processing unit 18 display the message on the display unit 32 along with the image data on Jupiter acquired from the stellar body watching engine 10 as if the message were received from the mobile terminal 1A at this timing (time point). Note that, this rendered effect screen 44 does not include the mailbox mark illustrated in FIG. 3.

In addition, the display processing unit 17 refers to the saved information to determine whether or not the selection from the action menu 43 made by the transmitting user on the initial screen 41 is the location information transfer request (S63). When the location information transfer request is not determined, the procedure advances to Step S66.

When the location information transfer request is determined (Yes), the display processing unit 17 receives the location information identified based on the positional information acquired by the positional information acquisition unit 14 from the GPS receiver 11 (S64).

The display processing unit 17 activates the e-mail application 21, and the e-mail application 21 notifies the message processing unit 18 of the e-mail data including an empty e-mail body whose e-mail header has been edited by the transmitting user. At this time, the message processing unit 18 passes to the communications processing unit 20 the e-mail data obtained by writing the image data ID of Jupiter, the location information, and the transfer type (location information transfer or distance information transfer), which have been received respectively from the display processing unit 17, into the e-mail body (S65).

The communications processing unit 20 transmits the e-mail data whose the e-mail body including those various kinds of transfer information to the mobile terminal 1B.

When the action menu 43 selected on the initial screen 41 is the location information transfer request, the rendered effect screen 44 displayed on the display unit 32 by the display processing unit 17 is intended to transmit the location information and the transfer type to the existence direction of Jupiter that the user of the mobile terminal 1A wishes to show to the other party (user of the mobile terminal 1B) to be the recipient of the e-mail.

On the mobile terminal 1B on the receiving end, when the communications processing unit 20 receives the e-mail transmitted from the mobile terminal 1A, the message processing unit 18 detects the e-mail receiving event. In response to a trigger of the detection of the e-mail receiving event performed by the message processing unit 18, the main control unit 30 expands in the RAM of the storage unit 31 the stellar body watching hookup communications control program installed in the ROM of the storage unit 31 as the application program, and starts to execute the stellar body watching hookup communications processing (S52). Step S51 is skipped.

On the mobile terminal 1B, subsequently to Step S52, Steps S53, S54, and S55 are repeated until the execution of the stellar body watching hookup communications processing is finished. With Steps S56 and S57 skipped, Steps S58, S61, and S63 all result in negative determination (No), and the procedure reaches Step S66.

After the detection of the e-mail receiving event, the message processing unit 18 determines based on a character string whether or not the e-mail body includes the image data ID of the stellar body (S66). When the image data ID of the stellar body is not included, the procedure advances to Step S71.

When the e-mail body is determined as the image data ID of the stellar body (Yes), the message processing unit 18 temporarily saves the e-mail data to the storage unit 31. After the saving, the message processing unit 18 passes to the e-mail application 21 the e-mail data obtained by rewriting the e-mail body into a guidance for turning toward the existence direction of the specific stellar body (Jupiter) based on the image data ID of the stellar body, for example, "You have incoming e-mail in the existence direction of Jupiter". The e-mail application 21 displays the guidance received from the message processing unit 18 on the display unit 32 via the display processing unit (S67).

Further, the message processing unit 18 passes the image data ID of Jupiter within the e-mail body to the display processing unit 17 (S68).

The display processing unit 17 acquires from the stellar body watching engine 10 the image data on Jupiter corresponding to the image data ID received from the message processing unit 18, and when the mobile terminal 1B is turned toward the existence direction of Jupiter that is known in advance by the receiving user, displays the image data on Jupiter on the display unit 32 and then notifies the message processing unit 18 that the displaying has been performed (S69).

With this notification, the message processing unit 18 passes the saved e-mail data to the e-mail application 21, and the e-mail application 21 displays the e-mail data on the display unit 32 via the display processing unit 17 (S70).

According to the above-mentioned e-mail receiving processing, when the user of the mobile terminal 1B who has been notified that there is an incoming e-mail in the existence direction of Jupiter turns the mobile terminal 1B toward the existence direction of Jupiter, the message is displayed along with the image data on Jupiter acquired from the stellar body watching engine 10 as if the message were received at this timing.

In other words, on the mobile terminal 1B, the e-mail has already been received, but under the control of the stellar body watching hookup communications control program, such a rendering that details of the received e-mail are kept from being displayed until the above-mentioned timing is performed.

Subsequently, after the detection of the e-mail receiving event, the message processing unit 18 determines based on the character string whether or not the e-mail body includes the image data ID of the stellar body, the location information, and the transfer type (S71). When those information pieces are not included, the procedure advances to an end step.

When the e-mail body is determined as the image data ID of the stellar body, the location information, and the transfer type (Yes), the message processing unit 18 passes all those information pieces to the display processing unit 17 (S72).

When there is a match in the image data ID of the stellar body between the mobile terminal 1A on the transmitting end and the mobile terminal 1B on the receiving end, and when the transfer type is the location information transfer, the display processing unit 17 displays the location information on the other party (mobile terminal 1A) described in the e-mail body on the display unit 32 (S73). For example, as this location information, "A person is now visiting from YY-city, XX-prefecture" is displayed.

Further, when there is a match in the image data ID of the stellar body between the mobile terminal 1A on the transmitting end and the mobile terminal 1B on the receiving end, and when the transfer type is the distance information transfer, the display processing unit 17 calculates the distance based on the location information on the own (mobile terminal 1B) received from the positional information acquisition unit 14 and the location information on the other party (mobile terminal 1A) described in the e-mail body, and displays the distance on the display unit 32 (S73). For example, as this distance information, "The distance from the visiting person is YY km" is displayed.

In the location information transfer and the distance information transfer, matching processing for the image data ID of the stellar body between the mobile terminal 1A on the transmitting end and the mobile terminal 1B on the receiving end is carried out in cooperation among the display processing unit 17, the message processing unit 18, the stellar body watching engine 10, and the like in the same manner as in the above-mentioned e-mail receiving processing.

According to the above-mentioned processing for the location information transfer and the distance information transfer, when the user of the mobile terminal 1B voluntarily or coincidentally turns the mobile terminal 1B toward the existence direction of Jupiter, the e-mail including the location information is displayed along with the image data on Jupiter acquired from the stellar body watching engine 10 as if the e-mail were received at this timing. In other words, on the mobile terminal 1B, the e-mail has already been received, but under the control of the stellar body watching hookup communications control program, such a rendering that the location information and the distance information are kept from being displayed until the above-mentioned timing is performed.

Note that, the above-mentioned processing for the location information transfer and the distance information transfer can be carried out by the mobile terminal 1A on the transmitting end, the mobile terminal 1B on the receiving end, and the server 3 in concert with one another.

In this case, the server 3 saves to the storage unit 3A the various kinds of transfer information, in other words, the image data ID of a specific stellar body (Jupiter), the location information, and the transfer type, which the server 3 is notified of (uploaded) by the message processing unit 18 of the mobile terminal 1A on the transmitting end through the communications network 2.

The mobile terminal 1B on the receiving end voluntarily or coincidentally accesses the server 3 associated with Jupiter, and acquires the saved various kinds of transfer information. In other words, on the mobile terminal 1B, when the receiving user turns the mobile terminal 1B toward the existence direction of Jupiter, the display processing unit 17 and the message processing unit 18 display the transfer information on the display unit 32 as if the transfer information were received from the mobile terminal 1A at this timing.

According to the disclosures made herein, it is possible to provide rendered effects to transmission/reception of various kinds of transfer information in concert with the stellar body watching engine, to thereby further improve the added value of the mobile terminal.

Modified Example

In the description of the operation according to the above-mentioned embodiment, the mobile terminal 1A and the mobile terminal 1B are set as the transmitting end and the receiving end, respectively, but each of the mobile terminals 1A and 1B can be carried out by a configuration including functions of both the transmitting end and the receiving end.

Further, the processing according to the above-mentioned embodiment is provided as a computer-executable program, and can be provided through a recording medium such as a CD-ROM or a flexible disk or even through a communications line.

In addition, with regard to the respective steps according to the above-mentioned embodiment, an arbitrary plurality thereof or all thereof can be selected and combined to be carried out.

[Others]

In relation to the above-mentioned embodiment and the modified example, the following notes are further disclosed.

(Note 1) E-mail Transmission/Message Transfer

A mobile terminal, which includes a communications function and displays at least an image relating to a specific stellar body when being turned toward a stellar body existence direction, the mobile terminal including:

means for detecting a direction of the mobile terminal turned toward the stellar body existence direction;

means for acquiring the image of the specific stellar body corresponding to the detected direction of the mobile terminal and image identification information thereon from a stellar body watching engine and, when any one of a plurality of kinds of information transfer is selected, controlling to display a rendered effect screen corresponding to the selected one of the plurality of kinds of information transfer and including the image of the specific stellar body; and means for transmitting, when the selected one of the plurality of kinds of information transfer is carried out in a state in which the rendered effect screen is displayed, at least the image identification information or a URL associated with the image identification information along with a content of the selected one of the plurality of kinds of information transfer.

(Note 2) E-mail Transmission

A mobile terminal according to Note 1, further including:

means for generating, when it is determined that the image identification information has been received, a guidance for turning the mobile terminal toward the stellar body existence direction identified based on the image identification information; and means for acquiring the image of the specific stellar body corresponding to the image identification information from the stellar body watching engine and controlling to display the content of the information transfer along with the image of the specific stellar body as if the content of the information transfer were received at a time point at which the mobile terminal is turned toward the stellar body existence direction in response to the guidance.

(Note 3) Location Information Transfer/Distance Information Transfer

A mobile terminal according to Note 1, in which the means for transmitting further transmits location information as the content of the information transfer, which is identified based on geographical positional information received from a GPS receiver, and a transfer type that designates a location information transfer or a distance information transfer.

(Note 4) Location information transfer/distance Information Transfer

A mobile terminal according to Note 3, further including means for acquiring, when it is determined that the image identification information, the location information, and the transfer type have been received, the image of the specific stellar body corresponding to the image identification information from the stellar body watching engine and controlling to display the content of the information transfer along with the image of the specific stellar body as if the content of the information transfer were received at a time point at which the mobile terminal is voluntarily turned toward the stellar body existence direction, in which the acquiring and controlling means displays the received location information when the transfer type is the location information transfer and displays a distance calculated based on the received location information and own location information when the transfer type is the distance information transfer.

(Note 5) Message Transfer/Location Information Transfer/Distance Information Transfer A mobile terminal according to Note 1 or 3, further including means for controlling to display, when the means for transmitting uploads the content of the information transfer onto a server identified by the URL associated with the image identification information, the content of the information transfer along with the image of the specific stellar body acquired from the stellar body watching engine as if the content of the information transfer were received at a time point at which the mobile terminal is voluntarily turned toward the stellar body existence direction associated with the server.

(Note 6)

A mobile terminal according to Note 1, in which the detecting means detects the direction of the mobile terminal corresponding to the stellar body existence direction by using a geomagnetic value acquired from a geomagnetic sensor and gravitational acceleration direction information based on an acceleration value received from an acceleration sensor.

(Note 7)

A mobile terminal according to Note 6, in which the direction of the mobile terminal is defined by an azimuth corresponding to an angle within a horizontal plane and by a posture corresponding to an angle within a vertical plane.

What is claimed is:

1. The mobile terminal including a communications function and displaying at least an image relating to a specific stellar body when being turned toward a stellar body existence direction, the mobile terminal comprising:

a detecting unit that detects a direction of the mobile terminal turned toward the stellar body existence direction;

a display processing unit that acquires the image of the specific stellar body corresponding to the detected direction of the mobile terminal and image identification information thereon from a stellar body watching engine and, when any one of a plurality of kinds of information transfer is selected, that controls to display a rendered effect screen corresponding to the selected one of the plurality of kinds of information transfer and including the image of the specific stellar body; and a transmitting unit that transmits, when the selected one of the plurality of kinds of information transfer is carried out in a state in which the rendered effect screen is displayed, at least the image identification information or a URL associated with the image identification information along with a content of the selected one of the plurality of kinds of information transfer; and the display processing unit that acquires, when it is determined that the image identification information, the location information, and the transfer type have been received, the image of the specific stellar body corresponding to the image identification information from the stellar body watching engine and that controls to display the content of the information transfer along with the image of the specific stellar body as if the content of the information transfer were received at a time point at which the mobile terminal is voluntarily turned toward the stellar body existence direction;

wherein the transmitting unit further transmits location information as the content of the information transfer, which is identified based on geographical positional information received from a GPS receiver, and a transfer type that designates a location information transfer or a distance information transfer, and wherein the display processing unit controls to display the received location information when the transfer type is the location information transfer and controls to display a distance calculated based on the received location information and own location information when the transfer type is the distance information transfer.

2. The mobile terminal including a communications function and displaying at least an image relating to a specific stellar body when being turned toward a stellar body existence direction, the mobile terminal comprising:

a detecting unit that detects a direction of the mobile terminal turned toward the stellar body existence direction;

a display processing unit that acquires the image of the specific stellar body corresponding to the detected direction of the mobile terminal and image identification information thereon from a stellar body watching engine and, when any one of a plurality of kinds of information transfer is selected, that controls to display a rendered effect screen corresponding to the selected one of the plurality of kinds of information transfer and including the image of the specific stellar body;

a transmitting unit that transmits, when the selected one of the plurality of kinds of information transfer is carried out in a state in which the rendered effect screen is displayed, at least the image identification information or a URL associated with the image identification information along with a content of the selected one of the plurality of kinds of information transfer; and the display processing unit that controls to display, when the transmitting unit uploads the content of the information transfer onto a server identified by the URL associated with the image identification information, the content of the information transfer along with the image of the specific stellar body acquired from the stellar body watching engine as if the content of the information transfer were received at a time point at which the mobile terminal is voluntarily turned toward the stellar body existence direction associated with the server.

3. A stellar body watching hookup communications control method executed by a mobile terminal including a communications function and displaying at least an image relating to a specific stellar body when being turned toward a stellar body existence direction, the method comprising:

detecting a direction of the mobile terminal turned toward the stellar body existence direction;

acquiring the image of the specific stellar body corresponding to the detected direction of the mobile terminal and image identification information thereon from a stellar body watching engine and, when any one of a plurality of kinds of information transfer is selected, controlling to display a rendered effect screen corresponding to the selected one of the plurality of kinds of information transfer and including the image of the specific stellar body;

transmitting, when the selected one of the plurality of kinds of information transfer is carried out in a state in which the rendered effect screen is displayed, at least the image identification information or a URL associated with the image identification information along with a content of the selected one of the plurality of kinds of information transfer;

transmitting location information as the content of the information transfer, which is identified based on geographical positional information received from a GPS receiver, and a transfer type that designates a location information transfer or a distance information transfer;

acquiring, when it is determined that the image identification information, the location information, and the transfer type have been received, the image of the specific stellar body corresponding to the image identification information from the stellar body watching engine and that controls to display the content of the information transfer along with the image of the specific stellar body as if the content of the information transfer were received at a time point at which the mobile terminal is voluntarily turned toward the stellar body existence direction; and displaying the received location information when the transfer type is the location information transfer and controls to display a distance calculated based on the received location information and own location information when the transfer type is the distance information transfer.

4. A non-transitory readable medium recorded with a stellar body watching hookup communications control program that causes a mobile terminal, which includes a communications function and displays at least an image relating to a specific stellar body when being turned toward a stellar body existence direction, to execute processing comprising:

detecting a direction of the mobile terminal turned toward the stellar body existence direction;

acquiring the image of the specific stellar body corresponding to the detected direction of the mobile terminal and image identification information thereon from a stellar body watching engine and, when any one of a plurality of kinds of information transfer is selected, controlling to display a rendered effect screen corresponding to the selected one of the plurality of kinds of information transfer and including the image of the specific stellar body;

transmitting, when the selected one of the plurality of kinds of information transfer is carried out in a state in which the rendered effect screen is displayed, at least the image identification information or a URL associated with the image identification information along with a content of the selected one of the plurality of kinds of information transfer;

transmitting location information as the content of the information transfer, which is identified based on geographical positional information received from a GPS receiver, and a transfer type that designates a location information transfer or a distance information transfer;

acquiring, when it is determined that the image identification information, the location information, and the transfer type have been received, the image of the specific stellar body corresponding to the image identification information from the stellar body watching engine and that controls to display the content of the information transfer along with the image of the specific stellar body as if the content of the information transfer were received at a time point at which the mobile terminal is voluntarily turned toward the stellar body existence direction; and displaying the received location information when the transfer type is the location information transfer and controls to display a distance calculated based on the received location information and own location information when the transfer type is the distance information transfer.

5. A stellar body watching hookup communications control method executed by a mobile terminal including a communications function and displaying at least an image relating to a specific stellar body when being turned toward a stellar body existence direction, the method comprising:

detecting a direction of the mobile terminal turned toward the stellar body existence direction;

acquiring the image of the specific stellar body corresponding to the detected direction of the mobile terminal and image identification information thereon from a stellar body watching engine and, when any one of a plurality of kinds of information transfer is selected, controlling to display a rendered effect screen corresponding to the selected one of the plurality of kinds of information transfer and including the image of the specific stellar body;

transmitting, when the selected one of the plurality of kinds of information transfer is carried out in a state in which the rendered effect screen is displayed, at least the image identification information or a URL associated with the image identification information along with a content of the selected one of the plurality of kinds of information transfer; and displaying, when the transmitting unit uploads the content of the information transfer onto a server identified by the URL associated with the image identification information, the content of the information transfer along with the image of the specific stellar body acquired from the stellar body watching engine as if the content of the information transfer were received at a time point at which the mobile terminal is voluntarily turned toward the stellar body existence direction associated with the server.

6. A non-transitory readable medium recorded with a stellar body watching hookup communications control program that causes a mobile terminal, which includes a communications function and displays at least an image relating to a specific stellar body when being turned toward a stellar body existence direction, to execute processing comprising:

detecting a direction of the mobile terminal turned toward the stellar body existence direction;

acquiring the image of the specific stellar body corresponding to the detected direction of the mobile terminal and image identification information thereon from a stellar body watching engine and, when any one of a plurality of kinds of information transfer is selected, controlling to display a rendered effect screen corresponding to the selected one of the plurality of kinds of information transfer and including the image of the specific stellar body;

transmitting, when the selected one of the plurality of kinds of information transfer is carried out in a state in which the rendered effect screen is displayed, at least the image identification information or a URL associated with the image identification information along with a content of the selected one of the plurality of kinds of information transfer; and displaying, when the transmitting unit uploads the content of the information transfer onto a server identified by the URL associated with the image identification information, the content of the information transfer along with the image of the specific stellar body acquired from the stellar body watching engine as if the content of the information transfer were received at a time point at which the mobile terminal is voluntarily turned toward the stellar body existence direction associated with the server.

* * * * *